(12) United States Patent
Sato et al.

(10) Patent No.: US 8,319,594 B2
(45) Date of Patent: Nov. 27, 2012

(54) CERAMIC ELECTRONIC COMPONENT

(75) Inventors: Koji Sato, Nagaokakyo (JP); Yukio Sanada, Nagaokakyo (JP); Makoto Ogawa, Nagaokakyo (JP); Yasuhiro Nishisaka, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/354,369

(22) Filed: Jan. 20, 2012

(65) Prior Publication Data
US 2012/0188682 A1    Jul. 26, 2012

(30) Foreign Application Priority Data

Jan. 21, 2011  (JP) .................................. 2011-010504
Dec. 14, 2011  (JP) .................................. 2011-273849

(51) Int. Cl.
*H01F 5/00*    (2006.01)
(52) U.S. Cl. ....................................................... 336/200
(58) Field of Classification Search .................. 336/65, 336/83, 192, 200, 232; 361/303, 306.1, 306.3, 361/309, 311
See application file for complete search history.

(56) References Cited

U.S. PATENT DOCUMENTS

| | | | | |
|---|---|---|---|---|
| 2006/0044098 | A1* | 3/2006 | Kimura et al. | 336/122 |
| 2010/0283114 | A1* | 11/2010 | Katsuki et al. | 257/467 |
| 2011/0234045 | A1* | 9/2011 | Motoki et al. | 310/311 |
| 2011/0273056 | A1* | 11/2011 | Mizuno et al. | 310/311 |
| 2011/0309718 | A1* | 12/2011 | Ogawa et al. | 310/311 |
| 2012/0019981 | A1* | 1/2012 | Yoshida | 361/321.1 |

FOREIGN PATENT DOCUMENTS

| | | |
|---|---|---|
| EP | 2 187 411 A2 | 5/2010 |
| JP | 05-082383 A | 4/1993 |
| JP | 2005-277444 A | 10/2005 |
| JP | 2005-322940 A | 11/2005 |
| JP | 2007-242715 A | 9/2007 |
| JP | 2008-198547 A | 8/2008 |
| JP | 2009-146732 A | 7/2009 |
| JP | 2009-253010 A | 10/2009 |
| JP | 2009-283986 A | 12/2009 |
| JP | 2010-141300 A | 6/2010 |

(Continued)

OTHER PUBLICATIONS

Nishisaka et al.; "Ceramic Electronic Component and Method for Manufacturing the Same"; U.S. Appl. No. 13/115,243, filed May 25, 2011.

(Continued)

*Primary Examiner* — Tuyen Nguyen
(74) *Attorney, Agent, or Firm* — Keating & Bennett, LLP

(57) ABSTRACT

A ceramic electronic component includes a ceramic body, a first external electrode, and a second external electrode. The first and second external electrodes are disposed on a principal surface, which is directed to the mounting surface side, of the ceramic body so as to face each other with a predetermined gap region therebetween. The external electrodes each include a base layer and a Cu plating layer which covers the base layer. In each of the first and second external electrodes, an expression $0.1 \leq t/d \leq 0.5$ is satisfied, where t is a thickness of the Cu plating layer at an end of the base layer on a gap region side, and d is a distance from the end of the base layer on the gap region side to an end of the Cu plating layer on the gap region side.

3 Claims, 8 Drawing Sheets

FOREIGN PATENT DOCUMENTS

JP    2010-237197 A    10/2010

OTHER PUBLICATIONS

Sato et al.; "Ceramic Electronic Component and Wiring Board", U.S. Appl. No. 13/178,530, filed Jul. 8, 2011.

Sato et al.; "Ceramic Electronic Component"; U.S. Appl. No. 13/187,617, filed Jul. 21, 2011.

Tsutsumi; "Electronic Component"; U.S. Appl. No. 13/224,465, filed Sep. 2, 2011.

* cited by examiner

CERAMIC ELECTRONIC COMPONENT

BACKGROUND OF THE INVENTION

1. Field of the Invention

The present invention relates to a ceramic electronic component, and more particularly, relates to an external electrode structure provided in a ceramic electronic component.

2. Description of the Related Art

In recent years, with a reduction in size and thickness of electronic devices, such as cell phones and portable music players, a reduction in size and thickness of ceramic electronic components which are installed in such electronic devices has also been advancing rapidly. Ceramic electronic components are usually mounted on wiring boards installed in electronic devices. With the reduction in size and thickness of ceramic electronic components, the strength of the ceramic electronic components tends to decrease.

For example, a ceramic electronic component illustrated in FIG. 1 of Japanese Unexamined Patent Application Publication No. 2009-146732 has a structure in which a base layer of each external electrode is formed by baking using a conductive paste having a specific composition, and a plating layer is formed thereon. In such a structure, stress generated during mounting easily concentrates on the tip portion of the external electrode including the plating layer, and cracks may occur, originating from the tip portion, in the ceramic electronic component in some cases. Description will be made more specifically with reference to FIG. 15.

FIG. 15 is a cross-sectional view schematically showing a monolithic ceramic capacitor 1 as an example of an existing ceramic electronic component, and is used to explain a problem caused by stress applied during mounting.

A ceramic body 2 included in the monolithic ceramic capacitor 1 has a first principal surface 3 and a second principal surface 4 which are opposed to each other, the second principal surface 4 being located on a mounting surface side. External electrodes 5 and 6 are disposed on both end portions of the ceramic body 2. When the monolithic ceramic capacitor 1 is mounted on a wiring board (not shown), the first principal surface 3 is held by suction using a suction head (not shown) of a mounter and mounted on the land of the wiring board. As shown in FIG. 15, stress due to inertia during mounting is applied to the first principal surface 3, and the point to which the stress is applied corresponds to a point of effort 7. Contact points between the wiring board and the first external electrode 5 and the second external electrode 6, which are disposed at both ends of the monolithic ceramic capacitor 1, serve as fulcrums 8 and 9, respectively. As a result, tips (surrounded by dotted lines) of portions of the external electrodes 5 and 6, which extend over the principal surface 4 on the mounting surface side, serve as points of load 10 and 11, respectively. Cracks tend to occur inside the ceramic body 2, originating from these points of load 10 and 11.

This phenomenon easily occurs when the principal surfaces 3 and 4 of the ceramic body 2 are parallel to the mounting surface, and in particular, with a reduction in height of the monolithic ceramic capacitor 1.

SUMMARY OF THE INVENTION

Accordingly, preferred embodiments of the present invention provide an external electrode structure of a ceramic electronic component capable of solving the problems as described above.

According to a preferred embodiment of the present invention, a ceramic electronic component includes a ceramic body including a first principal surface and a second principal surface opposed to each other, a first lateral surface and a second lateral surface opposed to each other, and a first end surface and a second end surface opposed to each other, the second principal surface being directed to the mounting surface side; a first external electrode located on a first end surface side of the ceramic body and disposed at least on the second principal surface; and a second external electrode located on a second end surface side of the ceramic body and disposed at least on the second principal surface, in which the first external electrode and the second external electrode are disposed on the second principal surface so as to face each other with a predetermined gap region therebetween.

It is preferred that the first external electrode and the second external electrode each include a base layer and a Cu plating layer which covers the base layer and which includes at least one layer, and in each of the first external electrode and the second external electrode, the expression $0.1 \leq t/d \leq 0.5$ is satisfied, where t is a thickness of the Cu plating layer at an end of the base layer on a gap region side, and d is a distance from the end of the base layer on the gap region side to an end of the Cu plating layer on the gap region side.

In order to determine the thickness t and the distance d, a method can be used in which a ceramic electronic component serving as a test piece is polished parallel to the lateral surfaces with a polisher until the size in the direction connecting between the first and second lateral surfaces becomes about ½, and the thickness t and the distance d of the Cu plating layer appearing in the polished cross-sectional surface are measured using a microscope having a function of measuring length.

Preferably, in each of the first and second external electrodes, the thickness of the Cu plating layer is larger than the thickness of the base layer.

Furthermore, the first and second external electrodes each may have a cross-sectional shape which tapers from the first or second end surface side to the gap region side.

According to various preferred embodiments of the present invention, in the second principal surface located on the mounting surface side of the ceramic body, by extending the Cu plating layer so as to satisfy the expression $0.1 \leq t/d \leq 0.5$, the distance between the end of the base layer and the end of the plating layer can be increased. As a result, stress to the tip portion of the external electrode on the second principal surface can be dispersed without being concentrated at one point, and it is possible to prevent cracks that may occur during mounting.

Furthermore, by extending the end of the Cu plating layer, the distance between the external electrodes can be decreased. Therefore, strength and resistance against stress during mounting increases, and it is possible to prevent cracks that may occur during mounting.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

A monolithic ceramic capacitor 21 according to a first preferred embodiment of the present invention will be described with reference to FIGS. 1 to 5.

The monolithic ceramic capacitor 21 includes a ceramic body 22, external electrodes 23 and 24, and internal electrodes 25 and 26. Details of the structure of the monolithic ceramic capacitor 21 and a method of manufacturing the same will be described below.

Figure 1:
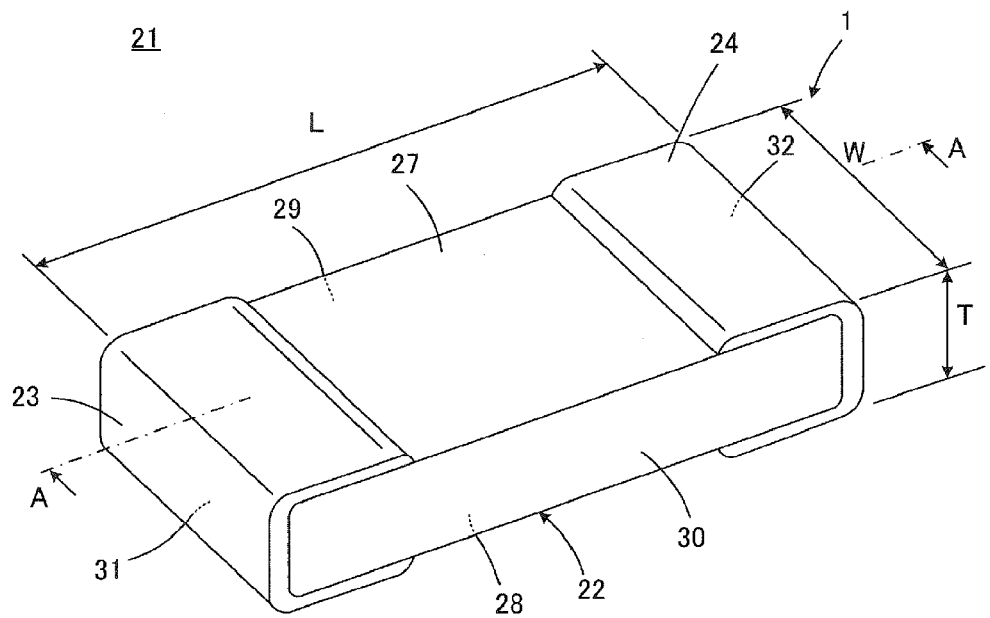
FIG. 1 is a perspective view showing an appearance of a monolithic ceramic capacitor according to a first preferred embodiment of the present invention.

As shown in FIG. 1, the ceramic body 22 includes a first principal surface 27 and a second principal surface 28 opposed to each other, a first lateral surface 29 and a second lateral surface 30 opposed to each other, and a first end surface 31 and a second end surface 32 opposed to each other. When the monolithic ceramic capacitor 21 is mounted, the second principal surface 28 is directed to the mounting surface side and mounted on a wiring board (not shown). Preferably, corners and edges of the ceramic body 22 are rounded.

Figure 3:
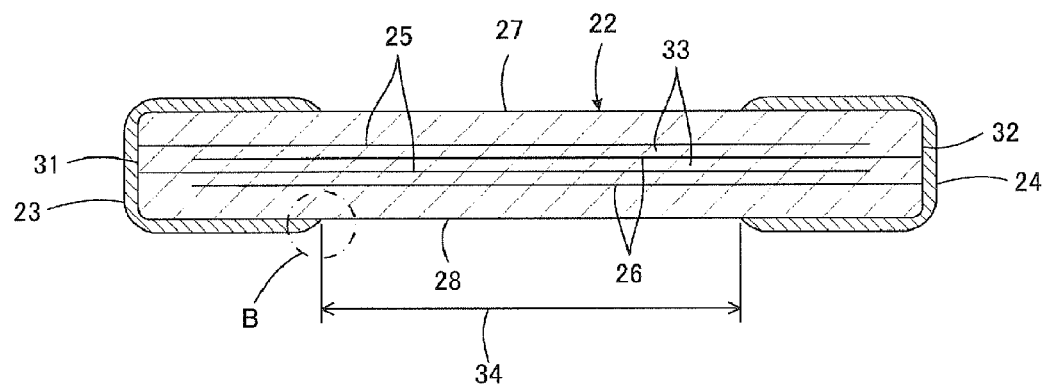
FIG. 3 is a cross-sectional view taken along the line A-A of FIG. 1.

As shown in FIG. 3, the ceramic body 22 has a multi-layer structure including a plurality of ceramic layers 33 stacked. As the ceramic material constituting the ceramic layers 33, for example, a dielectric ceramic containing, as a main component, $BaTiO_3$, $CaTiO_3$, $SrTiO_3$, $CaZrO_3$, or other suitable material can be used. The dielectric ceramic may further contain, as a secondary component, a Mn compound, a Mg compound, a Si compound, a Co compound, a Ni compound, a rare-earth element compound, or other suitable material.

The ceramic body 22 is obtained through a firing step. The thickness of each of the ceramic layers 33 after firing is preferably about 0.5 μm to about 10 μm, for example.

The ceramic body 22 on which the external electrodes 23 and 24, which will be described below, are provided, i.e., the monolithic ceramic capacitor 1 is preferably a thin type capacitor that satisfies the expressions $T \leq W < L$, $\frac{1}{5}W \leq T \leq \frac{1}{2}W$, and $T \leq 0.3$ mm, where L is the dimension along the direction connecting between the first end surface 31 and the second end surface 32, W is the dimension along the direction connecting between the first lateral surface 29 and the second lateral surface 30, and T is the dimension along the direction connecting between the first principal surface 27 and the second principal surface 28. Specifically, the expressions $0.1$ mm $\leq T \leq 0.3$ mm, $0.4$ mm $\leq L \leq 1$ mm, and $0.2$ mm $\leq W \leq 0.5$ mm are preferably satisfied.

In this preferred embodiment, since the monolithic ceramic capacitor 21 is described as an example of a ceramic electronic component, a dielectric ceramic is preferably used as the ceramic constituting the ceramic layers 33. However, when a piezoelectric ceramic, such as a PZT-based ceramic, is used, a ceramic electronic component functioning as a piezoelectric component can be obtained. When a semiconductor ceramic, such as a spinel-based ceramic, is used, a ceramic electronic component functioning as a thermistor can be obtained. When a magnetic ceramic, such as a ferrite, is used, a ceramic electronic component functioning as an inductor can be obtained.

Furthermore, in this preferred embodiment, the ceramic body 22 has a multi-layer structure including a plurality of ceramic layers 33. However, in the case where a multi-layer type ceramic electronic component is not provided, the ceramic body may have no internal electrodes and may have a single layer structure instead of a multi-layer structure.

The first external electrode 23 is located on the first end surface 31 side of the ceramic body 22 and disposed at least on the second principal surface 28. The second external electrode 24 is located on the second end surface 32 side of the ceramic body 22 and disposed at least on the second principal surface 28. The first external electrode 23 and the second external electrode 24 are disposed on the second principal surface 28 so as to face each other with a predetermined gap region 34 therebetween.

More specifically, the first external electrode 23 extends over the first principal surface 27, the first end surface 31, and the second principal surface 28, and is electrically connected to first internal electrodes 25 on the first end surface 31. On the other hand, the second external electrode 24 extends over the first principal surface 27, the second end surface 32, and the second principal surface 28, and is electrically connected to second internal electrodes 26 on the second end surface 32.

Figure 2:
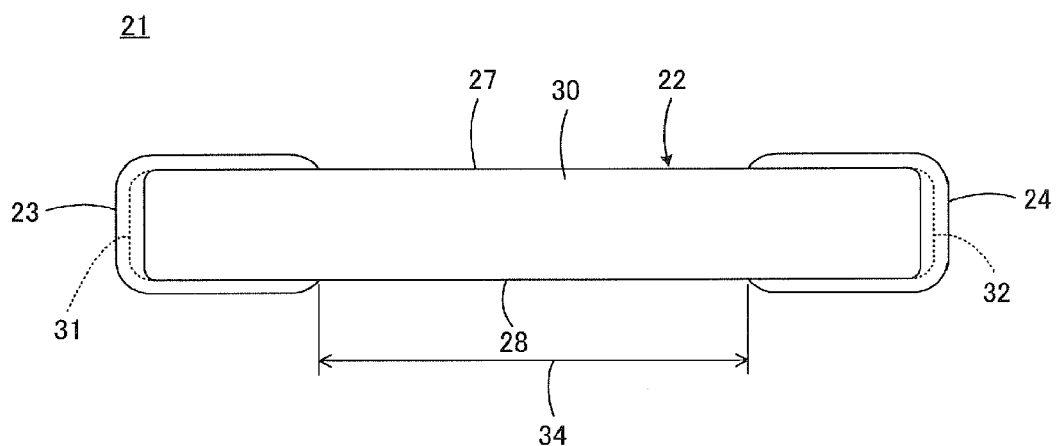
FIG. 2 is a side view showing a second lateral surface side of the monolithic ceramic capacitor shown in FIG. 1.

In this preferred embodiment, preferably, as seen in FIGS. 1 and 2, the first external electrode 23 and the second external electrode 24 are not substantially formed on the first lateral surface 29 and the second lateral surface 30. Therefore, the size of the monolithic ceramic capacitor 21 can be reduced with respect to the W direction shown in FIG. 1.

Figure 5:
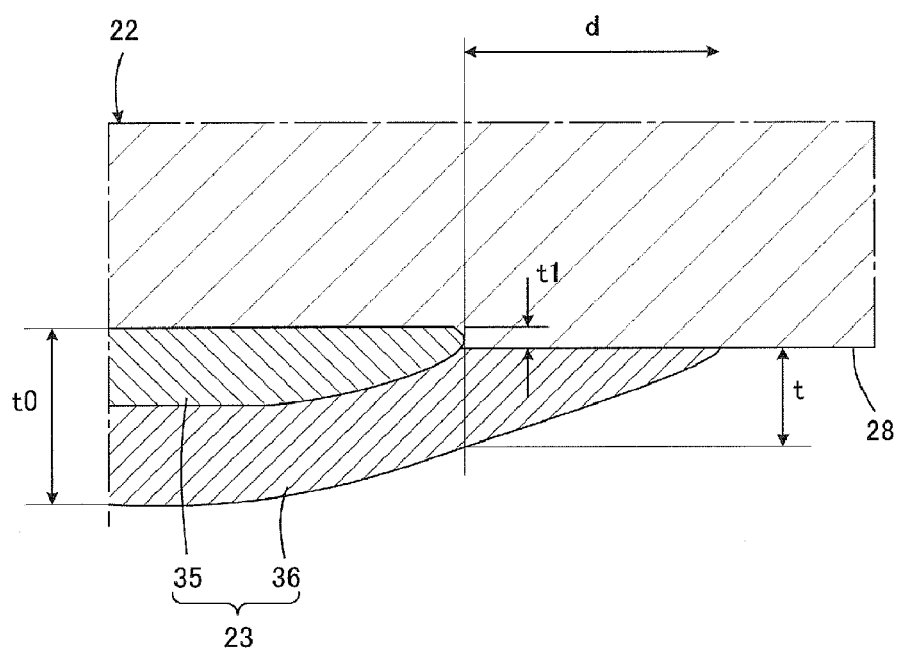
FIG. 5 is an enlarged cross-sectional view of a portion B shown in FIG. 3.

As shown regarding the first external electrode 23 in FIG. 5, the first external electrode 23 and the second external electrode 24 each include a base layer 35 and a Cu plating layer 36 which covers the base layer 35 and which includes at least one layer.

Examples of the conductive component constituting the base layer 35 include metals, such as Ni, Cu, Ag, Pd, and Au, and alloys containing at least one of these metals, such as an Ag—Pd alloy.

The base layer 35 includes an inorganic binder. The inorganic binder is a component used to increase adhesion strength to the ceramic body 22. When the base layer 35 is formed by co-firing with the ceramic body 22, as the inorganic binder, the same ceramic material as that contained in the ceramic body 22 or a ceramic material having the same main component as that of the ceramic material contained in the ceramic body 22 can be used. On the other hand, when the base layer 35 is formed by applying a conductive paste, followed by baking, as the inorganic binder, for example, a glass component can be used. The content of the inorganic binder in the base layer 35 is preferably in the range of about 40% to about 60% by volume, for example.

The base layer 35 is usually arranged so as to extend from the first principal surface 27 through the first or second end surface 31 or 32 to the second principal surface 28. However, the base layer 35 may be formed only on the first principal surface 27 and the second principal surface 28, or only on the second principal surface 27. As in the latter, when the base layer 35 is not formed on the end surface 31 or 32, the Cu plating layer 36 is electrically connected directly to the first or second internal electrodes 25 or 26.

The Cu plating layer 36 may include a plurality of layers. The thickness of the base layer 35 can be set at about 0.1 μm to about 20 μm, for example. The thickness of the Cu plating layer 36 is preferably larger than the thickness of the base layer 35 regardless of whether the Cu plating layer 36 includes one layer or a plurality of layers. Specifically, the thickness of the Cu plating layer 36 is preferably set at about 1 μm to about 15 μm, for example.

Although not shown in the drawing, as necessary, an upper plating layer may be further formed on the Cu plating layer 36. As the conductive component constituting the upper plating layer, for example, a metal selected from the group consisting of Cu, Ni, Sn, Pb, Au, Ag, Pd, Bi, and Zn, or an alloy containing the metal may be used. The thickness of the upper plating layer is preferably about 1 μm to about 15 μm, for example. Furthermore, the upper plating layer may include a plurality of layers. Preferably, the upper plating layer has a two-layer structure including a Ni plating layer and a Sn plating layer.

As described above, the first external electrode 23 and the second external electrode 24 are disposed on the second principal surface 28 so as to face each other with a predetermined gap region 34 therebetween. In this preferred embodiment, the first external electrode 23 and the second external electrode 24 are also disposed on the first principal surface 27 so as to face each other with a predetermined gap region therebetween.

According to the preferred embodiments of the present invention, as shown in FIG. 5, the expression $0.1 \leq t/d \leq 0.5$ is satisfied, where t is the thickness of the Cu plating layer 36 at the end position of the base layer 35 on the gap region 34 (refer to FIG. 3) side, and d is the distance from the end of the base layer 35 on the gap region 34 side to the end of the Cu plating layer 36 on the gap region 34 side.

Accordingly, while decreasing the thickness t of the Cu plating layer 36 at the end position of the base layer 35 on the gap region 34 side, the distance d between the end of the base layer 35 and the tip of the Cu plating layer 36 can be increased. As a result, stress applied to the end of the base layer 35 and stress applied to the tip of the Cu plating layer 36 during mounting can be dispersed without being concentrated at one point, and it is possible to prevent cracks that may occur during mounting. Furthermore, by extending the tip of the Cu plating layer 36, the distance between the external electrodes 23 and 24 can be decreased. Therefore, strength and resistance against stress during mounting increases, and it is possible to prevent cracks that may occur during mounting.

The satisfying of the condition described above, i.e., the extension of the distance d while decreasing the thickness t, can be achieved, for example, by setting the metal ion concentration in the plating bath for the Cu plating layer 36 to a value lower than usual.

In general, when a plating layer is formed, in the vicinity of the base layer formed on the principal surface and the end surface of the ceramic body, the consumption of metal ions increases in order to form the plating layer, and the metal ion concentration tends to decrease. On the other hand, in the vicinity of the gap region of the ceramic body, because of the absence of the base layer, the consumption of metal ions is smaller than that in the portion where the base layer is formed, and the metal ion concentration tends to be relatively high. This tendency becomes more noticeable in a plating bath having a low metal ion concentration. Furthermore, when a plating layer is formed, an electric field is apt to concentrate at the end position of the base layer on the gap region side rather than at the base layer on the principal surface and the end surface. Therefore, the plating layer is deposited preferably at the end position of the base layer on the gap region side at which the electric field is apt to concentrate.

For the two reasons described above, when a plating layer is formed in a plating bath having a low metal ion concentration, in the vicinity of the base layer formed on the principal surface and the end surface of the ceramic body, because of a small amount of metal ions and a low electric field, the plating layer is not easily formed. On the other hand, in the end portion of the base layer, since the electric field is high and the metal ion concentration is high compared with the vicinity of the base layer formed on the principal surface and the end surface of the ceramic body, the supply of metal ions is large compared with the vicinity of the base layer formed on the principal surface and the end surface of the ceramic body. As a result, in the plating layer, while preventing and suppressing the growth of the thickness t, the distance d can be extended.

The Cu plating layer 36 preferably is shaped so as to taper from each of the end surfaces 31 and 32 of the ceramic body 22 toward the end on the gap region 34 side.

As shown regarding the first external electrode 23 in FIG. 5, a portion of each of the external electrodes 23 and 24, more specifically, a portion of the base layer 35, may be embedded in the ceramic body 22. In this case, preferably the expression $(1/10)t0 \leq t1 \leq (2/5)t0$ is satisfied, where t0 is the thickness of the external electrode 23 located on the principal surface 28, and t1 is the thickness of a portion of the external electrode 23 embedded in the ceramic body 22.

When t1 is less than $(1/10)t0$, adhesion between the external electrode 23 and the ceramic body 22 becomes too low, and peel-off of the external electrode 23 easily occurs, which may result in low reliability. Furthermore, when t1 is less than $(1/10)t0$, a non-embedded portion of the external electrode 23 is too large, and the reduction in thickness of the monolithic ceramic capacitor 21 may not be achieved sufficiently in some cases.

On the other hand, when t1 is greater than $(2/5)t0$, reliability of the monolithic ceramic capacitor 21 may decrease in some cases. More specifically, when the external electrode 23 is embedded in the principal surface 28 of the ceramic body 22, a large stress is applied to the internal electrodes 25 or 26, the internal electrodes 25 or 26 are damaged, and as a result, a desired capacitance may not be obtained or short circuit may occur.

In this preferred embodiment, t0 can be set, for example, at about 10 μm to about 50 μm, for example.

As shown in FIG. 3, a plurality of first internal electrodes 25 and a plurality of second internal electrodes 26 are alternately disposed in the stacking direction of the ceramic body 22 with a ceramic layer 33 interposed therebetween.

Figure 4:
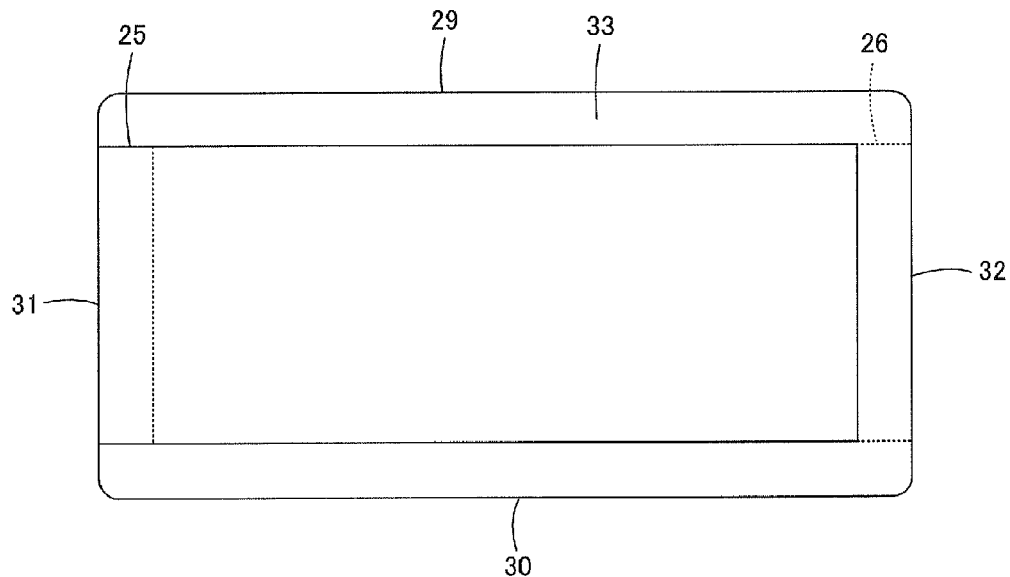
FIG. 4 is a plan view showing the internal structure of a ceramic body included in the monolithic ceramic capacitor shown in FIG. 1.

Referring to FIG. 4, the first internal electrode 25 is indicated by the solid line, and the second internal electrode 26 is indicated by the dotted line. As shown in FIGS. 3 and 4, the first internal electrodes 25 extend so as to be electrically connected to the first external electrode 23 at the first end surface 31. On the other hand, the second internal electrodes 26 extend so as to be electrically connected to the second external electrode 24 at the second end surface 32.

As the conductive component constituting the internal electrodes 25 and 26, for example, Ni, Cu, Ag, Pd, a Ag—Pd alloy, Au, or other suitable material may be used.

Furthermore, the thickness of each of the internal electrodes 25 and 26 is preferably about 0.3 μm to about 2.0 μm, for example.

An example of a method of manufacturing the monolithic ceramic capacitor 21 is described below.

Ceramic green sheets to be formed into ceramic layers 33, a conductive paste for internal electrodes, and a conductive paste for base layers of external electrodes are prepared. Each of the ceramic green sheets and the conductive pastes contains a binder and a solvent. As the binder and the solvent, a known organic binder and a known organic solvent can be used.

The conductive paste is printed in a predetermined pattern on the ceramic green sheets, for example, by screen-printing or the like, to form a conductive paste film for the internal electrode.

A predetermined number of ceramic green sheets for an outer layer on which a conductive paste film is not printed are stacked, the ceramic green sheets on which a conductive paste film for the internal electrode is printed are stacked one after another thereon, and a predetermined number of ceramic green sheets for an outer layer are stacked further thereon to form a mother laminated body.

Conductive paste films to be formed into base layers of electrodes are formed by screen-printing or other suitable process on both principal surfaces of the mother laminated body.

The mother laminated body is pressed in the stacking direction by isostatic pressing or other suitable process. In this process, when the base layer is embedded, the embedding amount can be adjusted, for example, by changing the pressing amount, the pressing pressure, and the hardness and modulus of elasticity of a member in contact with the mother laminated body during pressing. For example, when the mother laminated body is pressed without interposing an elastic body, such as rubber, between the die and each principal surface of the mother laminated body, the embedding amount of the base layer increases. In contrast, when pressing is performed with an elastic body, such as rubber, being interposed between the die and each principal surface of the mother laminated body, the embedding amount is relatively small. By changing the modulus of elasticity or the like of the elastic body, the embedding amount can be finely adjusted.

By cutting the mother laminated body into a predetermined size, a green ceramic body is obtained. In this process, corners and edges of the green ceramic body may be rounded by barrel polishing or other suitable process.

As necessary, the conductive paste is also applied to both end surfaces of the green ceramic body, for example, by dipping or other suitable process. Thereby, conductive paste films to be formed into base layers of the external electrodes are formed on both end surfaces of the ceramic body.

The green ceramic body is fired. The firing temperature depends on the ceramic materials and conductive materials used, but is preferably about 900° C. to about 1,300° C., for example. Thereby, the ceramic green sheets, the conductive paste for the internal electrodes, and the conductive paste for the base layers of the external electrodes are co-fired, and a ceramic body 22 in a sintered state is obtained.

As necessary, the ceramic body 22 is subjected to polishing, such as barrel polishing.

Then, by performing a plating treatment, Cu plating layers that cover the base layers of the external electrodes are formed. In the plating treatment, both electrolytic plating and electroless plating may be used. However, in electroless plating, in order to improve the plating deposition rate, pretreatment using a catalyst and the like is required, thus complicating the process, which is disadvantageous. Consequently, usually, electrolytic plating is preferably used. A barrel plating method is preferably used in the plating treatment.

Next, as necessary, upper plating layers are formed on the Cu plating layers.

Through the processes described above, a monolithic ceramic capacitor 21 is completed.

Description will be made below of a non-limiting experimental example carried out on the basis of the first preferred embodiment in order to confirm the advantageous effects of the present invention.

Monolithic ceramic capacitors used in the experiment were designed under the following conditions:

Thickness of ceramic layer after firing: 1.4 μm
Ceramic material constituting ceramic layer: $BaTiO_3$
Number of internal electrodes stacked: 23
Capacitance: 100 nF
Rated working voltage: 6.3 V
Overall size of monolithic ceramic capacitor:
L×W×T=1 mm×0.5 mm×0.15 mm
Thickness of ceramic body: 108 μm
Base layer of external electrode: 5.0-μm-thick Ni film
Cu plating layer of external electrode: One Cu plating layer with a thickness t of 7 μm at the end position on the gap region side
Firing conditions: Kept for 2 hours at a maximum temperature of 1,200° C.

Twenty monolithic ceramic capacitors were fabricated for each of Samples 1 to 7, in which, while commonly using the design conditions described above, by controlling the metal ion concentration in the plating bath to be lowered, the distance d from the end of the base layer of the external electrode on the gap region side to the end of the Cu plating layer on the gap region side was changed in the range of about 11.7 μm to about 70.0 μm as shown in Table.

The thickness t and the distance d with respect to the Cu plating layer were measured as described below. A monolithic ceramic capacitor serving as a test piece was polished parallel to the LT plane with a polisher ("GP-101" manufactured by Union Optical Co., Ltd.) until the size in the W direction became about ½, for example, and the thickness t and the distance d of the Cu plating layer appearing in the polished cross-sectional surface were measured using an optical microscope ("MEASURESCOPE MM-10" manufactured by Nikon Corporation). The thickness t and the distance d were measured on the ends of four base layers on the gap region side in the polished cross-sectional surface of each of 20 test pieces in Samples 1 to 7, and the measured values were averaged for each of Samples 1 to 7.

In order to evaluate the resulting test pieces, the flexural strength of the monolithic ceramic capacitors was measured. As the measurement method, a method described in Japanese Unexamined Patent Application Publication No. 2010-237197 was used. Specifically, a presser is pressed against the center of the principal surface of a monolithic ceramic capacitor placed on a stage, and a force is applied so that the load gradually increases. A load at which the ceramic capacitor is broken is detected by an acoustic emission (AE) sensor, and the value of load at that time is defined as a flexural strength. Measurement was performed on 20 test pieces for each of Samples 1 to 7, and the measured values were averaged for each of Samples 1 to 7. The results are shown in Table.

TABLE

| Sample No. | Thickness t [μm] | Distance d [μm] | t/d | Flexural strength [N] |
|---|---|---|---|---|
| 1 | 7.0 | 11.7 | 0.60 | 1.37 |
| 2 | 7.0 | 14.0 | 0.50 | 1.41 |
| 3 | 7.0 | 17.5 | 0.40 | 1.45 |
| 4 | 7.0 | 23.3 | 0.30 | 1.49 |
| 5 | 7.0 | 35.0 | 0.20 | 1.53 |
| 6 | 7.0 | 54.0 | 0.13 | 1.55 |
| 7 | 7.0 | 70.0 | 0.10 | 1.56 |

In the Table, the sample is considered to be acceptable if the flexural strength is 1.4 N or more.

In Samples 2 to 7, the flexural strength is 1.4 N or more, and t/d satisfies the expression $0.1 \leq t/d \leq 0.5$. In contrast, in Sample 1, t/d is 0.60, which is outside the expression $0.1 \leq t/d \leq 0.5$, and the flexural strength is 1.37 N, which is poor. From the results, it is evident that if t/d satisfies the expression $0.1 \leq t/d \leq 0.5$, a high flexural strength of 1.4 N or more can be obtained.

As a modification example of the first preferred embodiment described above, the base layer 35 can be formed by plating. In the case where the base layer 35 is formed by plating, as the metal constituting the base layer 35, for example, a metal selected from the group consisting of Cu, Ni, Ag, Pd, a Ag—Pd alloy, Au, Sn, Pd, Bi, and Zn, or an alloy containing the metal may be used. The resulting plating film preferably does not contain a glass component. Furthermore, in the plating film, the metal content per unit volume is preferably about 99% by volume or more. The thickness, at the thickest portion, of the plating film is preferably about 1 μm to about 15 μm, for example. Furthermore, in the base layer 35, portions on the first end surface 31 and the second end surface 32 only may be formed by plating, and portions on the first principal surface 27 and the second principal surface 28 may be formed by applying a conductive paste, followed by baking.

Second Preferred Embodiment

Figure 6:
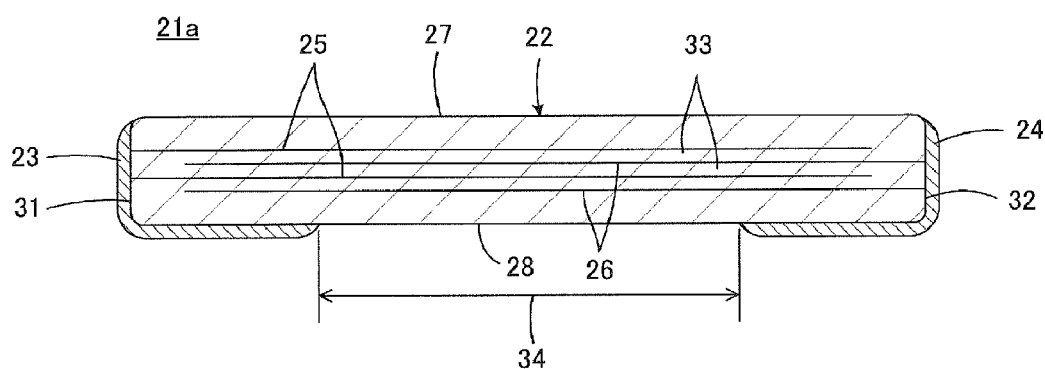
FIG. 6 is a cross-sectional view showing a monolithic ceramic capacitor according to a second preferred embodiment of the present invention and corresponding to FIG. 3.

A second preferred embodiment of the present invention is shown in FIG. 6. FIG. 6 is a view corresponding to FIG. 3. In FIG. 6, elements corresponding to the elements shown in FIG. 3 are denoted by the same reference numerals and duplicate descriptions will be omitted.

A monolithic ceramic capacitor 21a shown in FIG. 6 is characterized in that external electrodes 23 and 24 are not disposed on a first principal surface 27. Accordingly, the thickness of the monolithic ceramic capacitor 21a can be reduced.

When the monolithic ceramic capacitor 21a is mounted on a substrate (not shown), mounting is performed with the external electrodes 23 and 24 being directed downward, and when the monolithic ceramic capacitor 21a is embedded in a substrate, mounting is performed with the external electrodes 23 and 24 being directed upward, in some cases.

Third Preferred Embodiment

Figure 7:
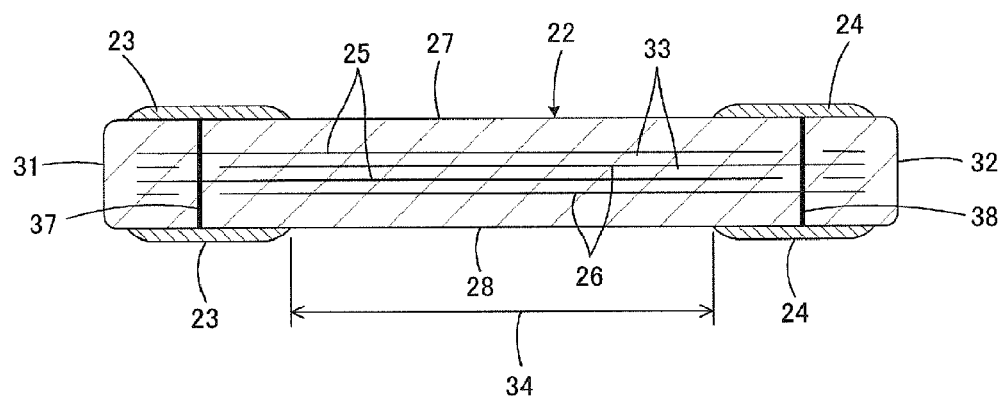
FIG. 7 is a cross-sectional view showing a monolithic ceramic capacitor according to a third preferred embodiment of the present invention and corresponding to FIG. 3.

A third preferred embodiment of the present invention is shown in FIG. 7. FIG. 7 is a view corresponding to FIG. 3. In FIG. 7, elements corresponding to the elements shown in FIG. 3 are denoted by the same reference numerals and duplicate descriptions will be omitted.

A monolithic ceramic capacitor 21b shown in FIG. 7 is characterized in that external electrodes 23 and 24 are disposed only on a first principal surface 27 and a second principal surface 28.

Furthermore, a ceramic body 22 includes a first via-hole conductor 37 which extends between the first principal surface 27 and the second principal surface 28 so as to electrically connect first internal electrodes 25 to the first external electrode 23, and a second via-hole conductor 38 which extends between the first principal surface 27 and the second principal surface 28 so as to electrically connect second internal electrodes 26 to the second external electrode 24. In addition, as a modification example of the third preferred embodiment, the external electrodes 23 and 24 may not be disposed on the first principal surface 27, and the via-hole conductors 48 and 49 may extend only to the second principal surface 28.

Fourth Preferred Embodiment

Figure 8:
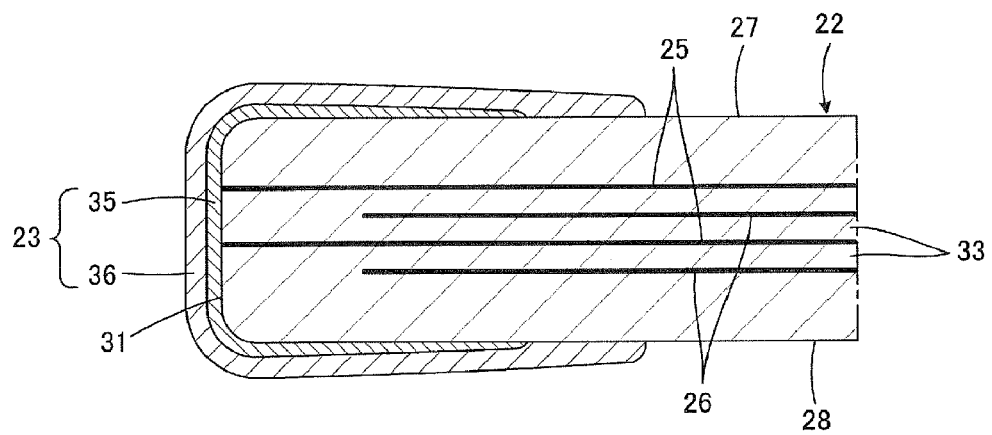
FIG. 8 is a cross-sectional view showing a portion of a monolithic ceramic capacitor according to a fourth preferred embodiment of the present invention.

A fourth preferred embodiment of the present invention is shown in FIG. 8. FIG. 8 is a view corresponding to an enlarged view of a portion shown in FIG. 3. In FIG. 8, elements corresponding to the elements shown in FIG. 3 are denoted by the same reference numerals and duplicate descriptions will be omitted.

A monolithic ceramic capacitor 21c shown in FIG. 8 is characterized in that external electrodes 23 and 24 each have a cross-sectional shape which tapers along the L direction (refer to FIG. 1) from the end surface 31 or 32 side to the tip side at portions disposed on principal surfaces 27 and 28. In particular, in this preferred embodiment, a base layer 35 of each of the external electrodes 23 and 24 has the tapered shape described above.

Fifth Preferred Embodiment

Figure 9:
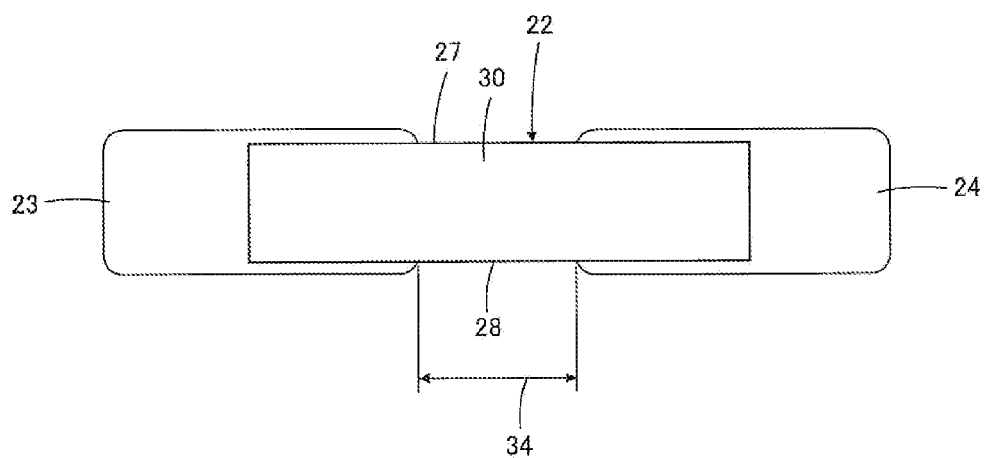
FIG. 9 is a side view showing a monolithic ceramic capacitor according to a fifth preferred embodiment of the present invention and corresponding to FIG. 2.
Figure 10:
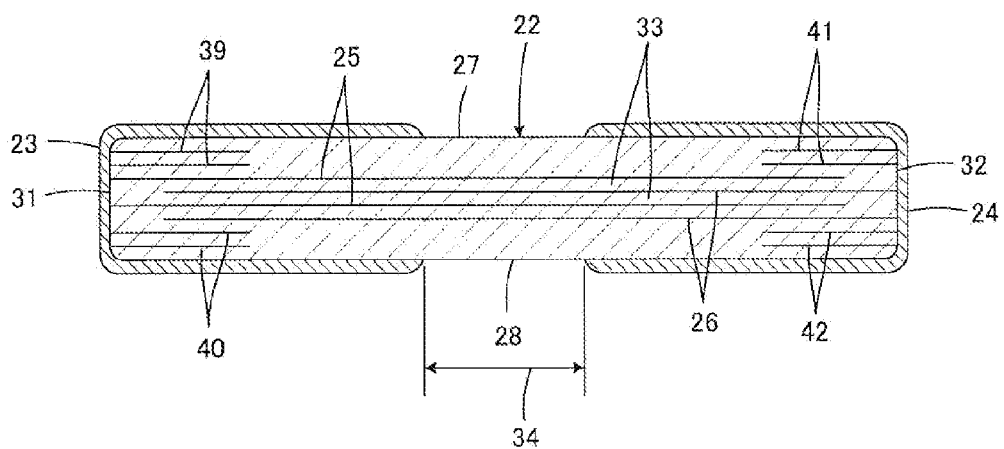
FIG. 10 is a cross-sectional view showing the monolithic ceramic capacitor shown in FIG. 9 and corresponding to FIG. 3.
Figure 11:
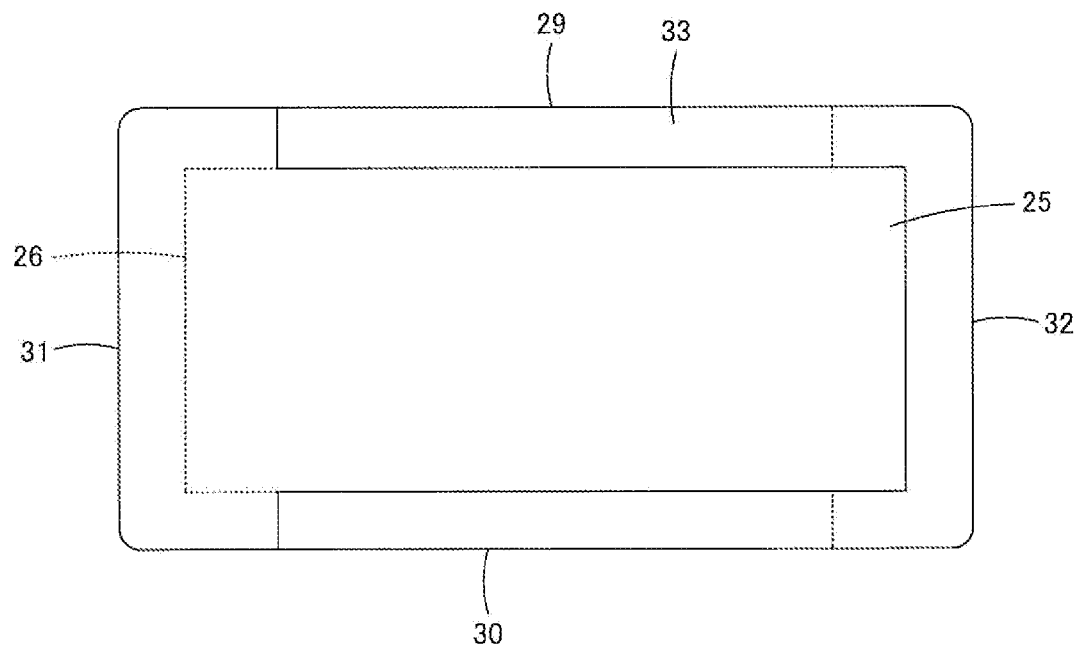
FIG. 11 is a plan view showing the internal structure of a ceramic body included in the monolithic ceramic capacitor shown in FIG. 9 and corresponding to FIG. 4.

A fifth preferred embodiment of the present invention is shown in FIGS. 9 to 11. FIG. 9 corresponds to FIG. 2, FIG. 10 corresponds to FIG. 3, and FIG. 11 corresponds to FIG. 4. In FIGS. 9 to 11, elements corresponding to the elements shown in FIGS. 2 to 4 are denoted by the same reference numerals and duplicate descriptions will be omitted.

As seen in FIG. 9, a monolithic ceramic capacitor 21d according to the fifth preferred embodiment is characterized in that external electrodes 23 and 24 are also disposed on a first lateral surface 29 and a second lateral surface 30. However, in portions of the external electrodes 23 and 24 located on the lateral surfaces 29 and 30, the length in the L direction (refer to FIG. 1) is shorter than that of portions located on principal surfaces 27 and 28.

Furthermore, as shown in FIG. 11, internal electrodes 25 and 26 are T-shaped in plan view, and extend not only to a first or second end surface 31 or 32 but also to the first lateral surface 29 and the second lateral surface 30.

Furthermore, dummy electrodes 39 to 42 are disposed between one of outer-layer portions of a ceramic body 22, i.e., portions of the external electrodes 23 and 24 disposed on the principal surfaces 27 and 28, and the internal electrodes 25 and 26. The dummy electrodes 39 to 42 extend to the first end surface 31 or the second end surface 32 and to the first lateral surface 29 and the second lateral surface 30.

In the fifth preferred embodiment, preferably, portions of a base layer 35 (refer to FIG. 5) located on the lateral surfaces 29 and 30 and the end surface 31 or 32 in each of the external electrodes 23 and 24 are formed by plating, and portions of the base layer 35 located on the principal surfaces 27 and 28 are formed by applying a conductive paste, followed by baking. In this case, the dummy electrodes 39 to 42 function to promote deposition of a plating film to form portions of the base layer 35 located on the lateral surfaces 29 and 30 and the end surfaces 31 and 32.

Sixth Preferred Embodiment

Figure 12:
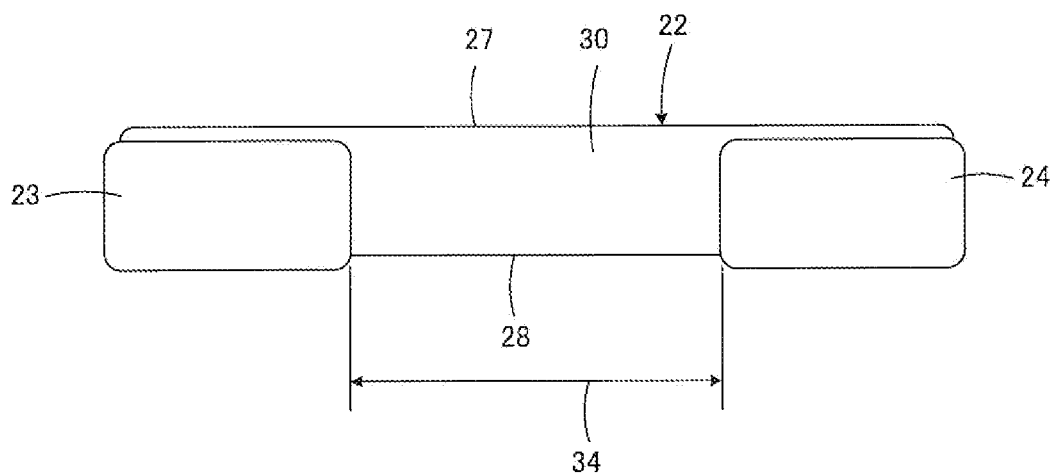
FIG. 12 is a side view showing a monolithic ceramic capacitor according to a sixth preferred embodiment of the present invention and corresponding to FIG. 2.
Figure 13:
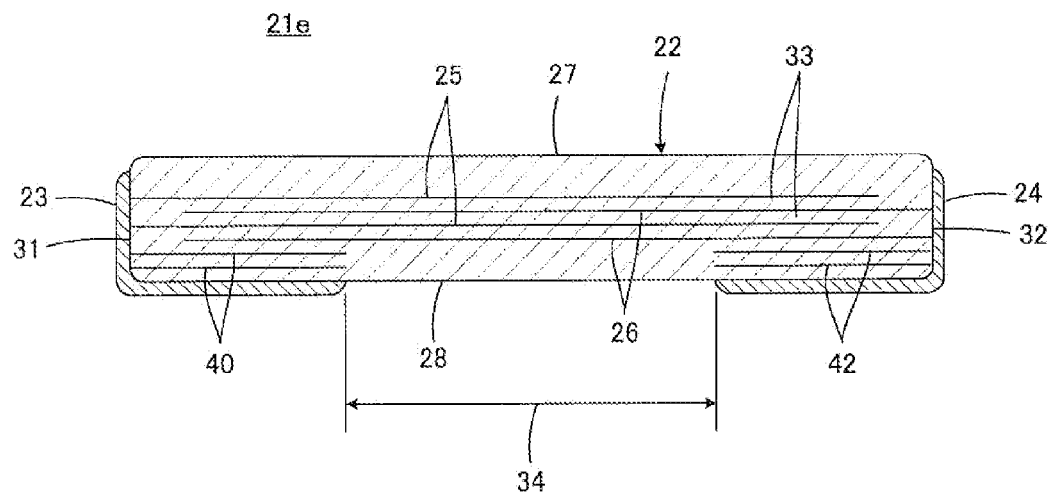
FIG. 13 is a cross-sectional view showing the monolithic ceramic capacitor shown in FIG. 12 and corresponding to FIG. 3.
Figure 14:
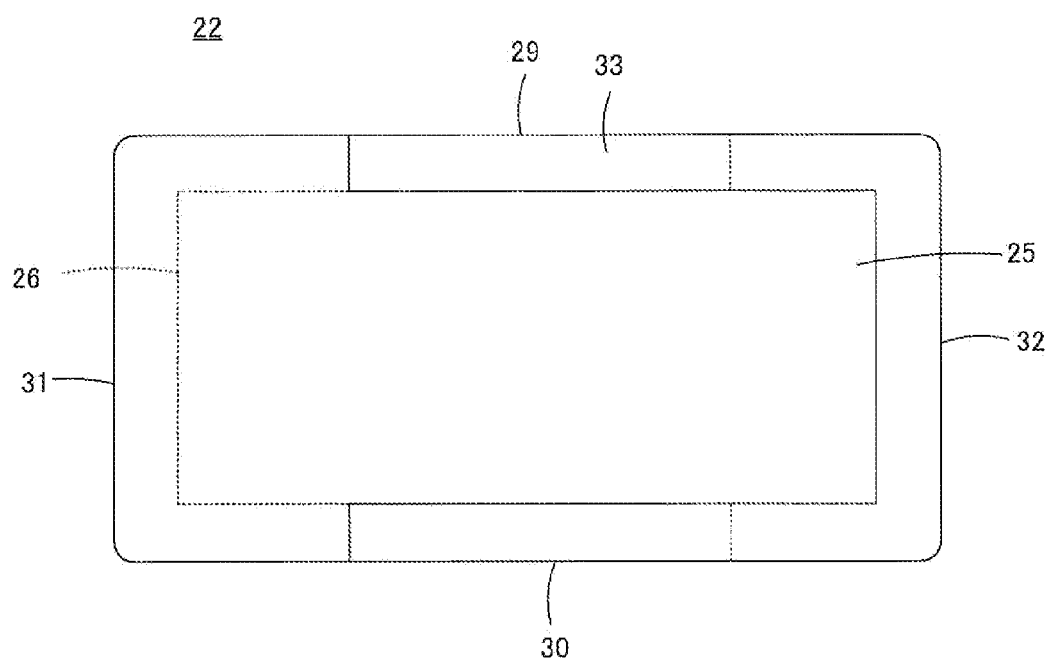
FIG. 14 is a plan view showing the internal structure of a ceramic body included in the monolithic ceramic capacitor shown in FIG. 12 and corresponding to FIG. 4.
Figure 15:
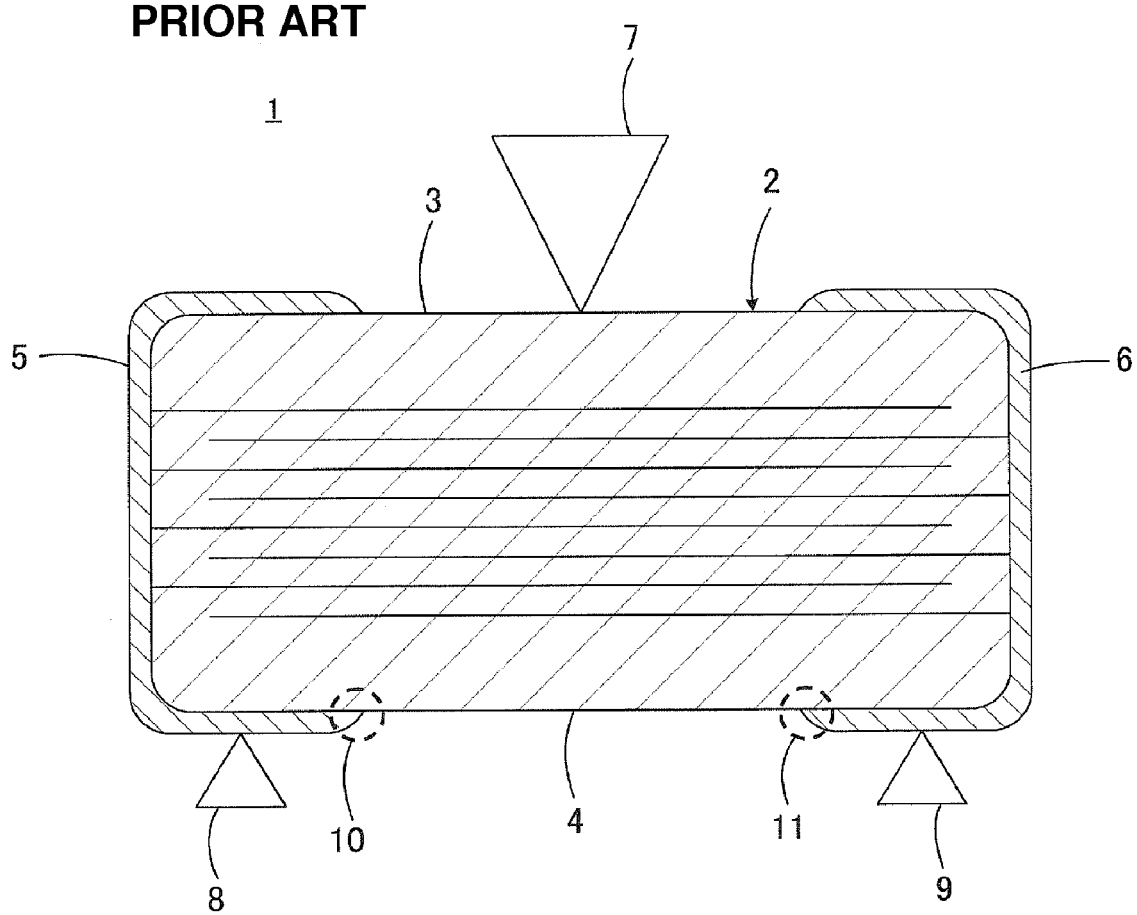
FIG. 15 is a cross-sectional view showing a monolithic ceramic capacitor as an example of an existing monolithic ceramic electronic component, and is used to explain a problem caused by stress applied during mounting.

A sixth preferred embodiment of the present invention is shown in FIGS. 12 to 14. FIG. 12 corresponds to FIG. 2, FIG. 13 corresponds to FIG. 3, and FIG. 14 corresponds to FIG. 4. In FIGS. 12 to 14, elements corresponding to the elements shown in FIGS. 2 to 4 are denoted by the same reference numerals and duplicate descriptions will be omitted.

A monolithic ceramic capacitor 21e according to the sixth preferred embodiment is a modification example of the monolithic ceramic capacitor 21d according to the fifth preferred embodiment described above. Accordingly, the monolithic ceramic capacitor 21e will be described in comparison with the monolithic ceramic capacitor 21d.

In the monolithic ceramic capacitor 21e, external electrodes 23 and 24 are not disposed on a first principal surface 27.

Furthermore, as seen in FIGS. 12 and 13, the external electrodes 23 and 24 are preferably disposed on a first lateral surface 29 and a second lateral surface 30. However, in portions of the external electrodes 23 and 24 located on the lateral surfaces 29 and 30, the length in the L direction (refer to FIG. 1) is the same as that of a portion located on the principal surface 28. A ceramic body 22 includes regions where the external electrodes 23 and 24 are not disposed on some portions in the height direction.

Furthermore, as in the monolithic ceramic capacitor 21d, as shown in FIG. 14, internal electrodes 25 and 26 preferably are T-shaped in plan view, and extend not only to a first or second end surface 31 or 32 but also to the first lateral surface 29 and the second lateral surface 30.

Furthermore, dummy electrodes 40 and 42 are disposed between an outer-layer portion of the ceramic body 22, i.e., a portion of the external electrode 23 or 24 disposed on the second principal surface 28, and the internal electrodes 25 and 26. The dummy electrodes 40 and 42 perform the same function as that of the dummy electrodes 39 to 42 in the fifth preferred embodiment, and extend to the first end surface 31 or the second end surface and to the first lateral surface 29 and the second lateral surface 30.

In the sixth preferred embodiment, preferably, portions of a base layer 35 (refer to FIG. 5) located on the lateral surfaces 29 and 30 and the end surface 31 or 32 in each of the external electrodes 23 and 24 are formed by plating, and a portion of the base layer 35 located on the second principal surface 28 is formed by applying a conductive paste, followed by baking.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic electronic component comprising:
a ceramic body including a first principal surface and a second principal surface opposed to each other, a first lateral surface and a second lateral surface opposed to each other, and a first end surface and a second end surface opposed to each other, the second principal surface being located at to a mounting surface side of the ceramic body;
a first external electrode located on the first end surface side of the ceramic body and disposed at least on the second principal surface; and
a second external electrode located on the second end surface side of the ceramic body and disposed at least on the second principal surface; wherein
the first external electrode and the second external electrode are disposed on the second principal surface so as to face each other with a predetermined gap region therebetween;
the first external electrode and the second external electrode each include a base layer and a Cu plating layer which covers the base layer and which includes at least one layer; and
in each of the first external electrode and the second external electrode, an expression $0.1 \leq t/d \leq 0.5$ is satisfied, where t is a thickness of the Cu plating layer at an end of the base layer on the gap region side, and d is a distance from the end of the base layer on the gap region side to an end of the Cu plating layer on the gap region side.

2. The ceramic electronic component according to claim 1, wherein in each of the first external electrode and the second external electrode, the thickness of the Cu plating layer is larger than a thickness of the base layer.

3. The ceramic electronic component according to claim 1, wherein the first external electrode and the second external electrode each have a cross-sectional shape which tapers from the first end surface side or the second end surface side to the gap region side.

* * * * *